(12) United States Patent
Masumoto et al.

(10) Patent No.: US 6,888,955 B2
(45) Date of Patent: May 3, 2005

(54) PICTURE RECOGNITION APPARATUS AND METHOD

(75) Inventors: Daiki Masumoto, Kawasaki (JP); Naoki Sashida, Kawasaki (JP); Hiroki Kitagawa, Kawasaki (JP); Shigemi Nagata, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 718 days.

(21) Appl. No.: 09/772,924

(22) Filed: Jan. 31, 2001

(65) Prior Publication Data

US 2001/0038714 A1 Nov. 8, 2001

(30) Foreign Application Priority Data

Apr. 25, 2000 (JP) .................................... 2000-123604

(51) Int. Cl.$^7$ .................. G06K 9/00; G06K 9/46; G06K 9/66
(52) U.S. Cl. .............. 382/118; 382/181; 382/190
(58) Field of Search ................ 382/115–118, 154, 382/181, 190; 340/5.1, 5.2, 5.53, 5.81–5.83; 348/77, 78

(56) References Cited

U.S. PATENT DOCUMENTS 5,815,325 A * 9/1998 Johnson ...................... 382/118
5,828,769 A * 10/1998 Burns ........................ 382/118

FOREIGN PATENT DOCUMENTS

| JP | 10-228543 | 8/1998 |
|----|-----------|--------|
| JP | 11-085988 | 3/1999 |
| JP | 2000306095 | 11/2000 |

OTHER PUBLICATIONS

Martinez, Face Image Retrieval Using HMMs, Jun. 22, 1999, Content–Based Access of Image and Video Libraries (CBAIVL '99) Proceedings.*

Georghiades, Belhumeur, Kriegman; From few to many: generative models for recognition under variable pose and illumination Mar. 2000; Automatic Face and Gesture Recognition, 2000 Proceedings. Fourth IEEE International Conference; pp. 277–284.*

Georghiades, Belhumeur, Kriegman; Illumination–based image synthesis creating novel images of human faces under differing pose and lighting; Jun. 26, 1999; IEEE Workshop on Multi–view modeling and anlysis of visual scene proceedings; pp. 47–5.*

Hallinan; A low–dimensional representation of human faces for arbitrary lighting conditions; 1994; Proc. IEEE Conf. on Comp. Vision and Patt. Recog., pp. 995–999.*

* cited by examiner

*Primary Examiner*—Bhavesh M. Mehta
*Assistant Examiner*—John Strege
(74) *Attorney, Agent, or Firm*—Staas & Halsey LLP

(57) ABSTRACT

The variations in appearance of an object caused by the variations in a capturing environment are estimated to be modeled, and the object model thus obtained is previously registered in a database. Picture information of an object to be a recognition target is input, and the input picture information is matched with the previously registered object model. The similarity with respect to the registered object model is determined, and the type of the object to be a recognition target is output, which is determined to be most similar among the registered object models. Information of a plurality of pictures captured by changing the relative position and posture of an object is input, and the variations in appearance of an object caused by the possible variations in a capturing environment are estimated to be modeled based on the input information of a plurality of pictures.

11 Claims, 11 Drawing Sheets

Input picture series

Partial space sashida

PICTURE RECOGNITION APPARATUS AND METHOD

BACKGROUND OF THE INVENTION

1. Field of the Invention

The present invention relates to a picture recognition apparatus for accumulating an object model converted from picture information of an object in a database, and consulting the database for picture recognition to recognize the object.

2. Description of the Related Art

With the advancement of a computer network such as the Internet, anybody can easily access various information, while the importance of a technique of confirming if a person accessing information is an authentic individual (i.e., an authentication technique) is being increased. This is because it is required to prevent an authentic individual from being mistaken for a pretender, or to minimize the probability of rejecting an authentic individual as a pretender.

One of the techniques, receiving most attention in recent years, in such a field is an authentication technique using a face picture for the following reason: like fingerprints and a voice print, a face is peculiar to an individual and can be a target used as a standard for recognition due to the advancement of a picture processing technique.

As a method using a face picture for recognition, various methods have been disclosed in the past. For example, JP11(1999)-110020 discloses a technique in which an environment parameter value representing the state of a capturing environment and a target state parameter value representing the state of a target are estimated from an input picture, and based on the values, recognition is performed by using a "picture for matching" corrected in such a manner that the states of a capturing environment and a target of the input picture match with those of a capturing environment and a target of a registered picture.

Hereinafter, the above-mentioned picture recognition processing using an environment parameter and a target state parameter disclosed in the above publication will be described with reference to FIGS. 1 to 4. FIG. 1 shows a flow of processing in a registration phase with respect to a database in the picture recognition processing.

In FIG. 1, first, a picture to be a registration target is input (Operation 11). Herein, one face picture captured from the front direction may be used. However, in order to enhance a recognition precision, it is desirable to prepare face pictures captured in various directions in addition to the front picture.

Next, a face region is cut out from the input picture (Operation 12) to obtain a picture of a face region (Operation 13). More specifically, as shown in FIG. 2, a face region is cut out as a rectangular region on the picture to be a registration target.

Then, the picture of the face region thus obtained is considered as an N-dimensional vector having each pixel as an element. The vector is projected onto an n-dimensional ($n \leq N$) partial space (Operation 14), and the projected point is represented as P. In FIG. 2, the vector is projected onto one point of "sashida".

Furthermore, an environment parameter value e representing the state of a capturing environment and a target state parameter value s representing the state of a target are estimated, and the estimated values and the projected point P are registered in a database as a pair (Operation 15). In the above-mentioned publication, there is no disclosure about a general method for estimating, from the picture, an environment parameter value e representing the state of a capturing environment and a target state parameter value s representing the state of a target.

FIG. 3 shows a flow of processing in a recognition phase in the picture recognition processing. In FIG. 3, the operations of inputting a picture to cutting out a picture of a face region (Operations 31 to 33) are the same as those in the registration phase in FIG. 1 (Operations 11 to 13).

Thus, the vector is projected onto one point of "sashida" in a partial space as shown in FIG. 4.

On the other hand, an environment parameter value e representing the state of a capturing environment and a target state parameter value s representing the state of a target are estimated from an input picture. Then, the parameter values estimated from the input picture are adjusted so as to match with the environment parameter value e and the target state parameter value s of the previously registered picture. Because of this adjustment, a picture for matching is generated in such a manner that the states of the capturing environment and the target of the input picture match with those of the capturing environment and the target of the registered picture. The picture for matching is projected onto a partial space to obtain a projected point Q (Operation 34).

Consequently, the registered picture is compared with the picture for matching under the same conditions regarding the states of a capturing environment (e.g., illumination), a target's position, posture, and the like. However, there is no disclosure about a general method for adjusting parameter values to generate a picture for matching in such a manner that the states of a capturing environment and a target of an input picture match with the states of a capturing environment and a target of a registered picture.

Then, the distance between the registered point P and the point Q in a partial space is calculated (Operation 305). Regarding all the registered pictures, the spatial distance is similarly calculated to find the closest point $P_m$ (Operation 36).

Finally, the registered picture corresponding to the closest point $P_m$ is recognized as that corresponding to the input picture (Operation 37).

However, according to the above-mentioned method, although there are advantages in that (1) an environment parameter value representing the state of a capturing environment and a target state parameter value representing the state of a target are estimated from a picture, and (2) parameter values are adjusted to generate a picture for matching in such a manner that the states of the capturing environment and the target of the input picture match with those of the capturing environment and the target of the registered picture, a general method for realizing these procedures is not known.

JP11(1999)-110020 proposes that an illumination parameter among environment parameters is estimated from a mean value, a variance, and a histogram of a brightness value of a face region picture, and that the resolution, focus, and exposure of a camera utilized for capturing are used as camera parameters among environment parameters. JP11 (1999)-110020 also proposes that a target state parameter is estimated by using a skin color occupying area in a picture of a face region.

However, it is generally difficult to correctly estimate the above-mentioned parameter values. It is also difficult to model, from one or a few pictures, changes in a picture caused by the variations in these parameters. Thus, it is considered to be difficult to actually apply the above-mentioned method to recognition processing.

A face picture captured from the front direction is used for picture registration, so that an authentic individual may be mistaken for a pretender or a pretender may be mistaken for an authentic individual, in the case where the direction of a face and/or illumination conditions are varied at a time of input of a picture to be a recognition target

SUMMARY OF THE INVENTION

Therefore, with the foregoing in mind, it is an object of the present invention to provide a picture recognition apparatus and method capable of conducting matching with respect to a registered picture with a good precision without being influenced by capturing conditions of an input picture at a time of picture recognition.

In order to achieve the above-mentioned object, the picture recognition apparatus of the present invention includes: an object modeling execution part for estimating variations in appearance of an object caused by variations in a capturing environment and modeling the object; an object model registering part for previously registering the object model obtained in the object modeling execution part in a database; a picture information input part for inputting picture information of an object to be a recognition target; a similarity determining part for matching the input picture information with the object model previously registered in the object model registering part, and determining a similarity with respect to the registered object model; and an object recognizing part for outputting a type of the object to be a recognition target determined to be most similar among the registered object model, wherein, in the object modeling execution part, information of a plurality of pictures captured by changing a relative position and posture of the object with respect to the fixed picture information input part is input, and variations in appearance of the object caused by possible variations in a capturing environment are estimated to be modeled based on the input information of a plurality of pictures.

Because of the above-mentioned structure, an input picture can be matched with a registered object model with a good precision without being influenced by the variations in appearance caused by the variations in an object's posture and the variations in appearance caused by the variations in illumination conditions between object model registration and input picture recognition.

Furthermore, it is preferable that a Lambertian reflection model is assumed as surface characteristics of the object to be a recognition target. This is because it becomes easy to expect the variations in appearance caused by the variations in illumination.

Furthermore, it is preferable that, in the picture information input part, a portion including the object to be a recognition target is cut out from a picture, and the object to be a recognition target is modeled using the cut out portion. This is because misrecognition caused by excessive picture information can be prevented.

Furthermore, it is preferable that, in the picture information input part, a characteristic small region in the object to be a recognition target is selected from a picture, and the object to be a recognition target is modeled based on information included in the selected small region and arrangement information of the small region. This is because the case is also handled in which a characteristic portion is partially covered with a picture.

Furthermore, it is preferable that, in the case where the amount of sample data is small, in the object modeling execution part, variations in appearance caused by variations in a posture of the object and variations in appearance caused by variations in illumination conditions are separately modeled based on the input picture information. This is because even in the case where the amount of sample data is small, the variations in appearance can be correctly estimated.

Furthermore, it is preferable that, in the case where there is sufficient sample data, in the object modeling execution part, variations in appearance caused by variations in a posture of the object and variations in appearance caused by variations in illumination conditions are modeled together based on the input picture information. This is because in the case where there is sufficient sample data, it is not required to separately model variations in appearance caused by variations in a posture of the object and variations in appearance caused by variations in illumination conditions to achieve approximate modeling, and the variations in appearance can be directly obtained.

Furthermore, the present invention is characterized by software for executing the function of the above-mentioned picture recognition apparatus as processing of a computer. More specifically, the present invention is characterized by a computer-readable recording medium storing, as a program, the following: estimating variations in appearance caused by variations in a capturing environment and modeling the object; previously registering the obtained object model in a database and modeling the object; inputting picture information of an object to be a recognition target; matching the input picture information with the previously registered object model to determine a similarity with respect to the registered object model; and outputting a type of the object to be a recognition target determined to be most similar among the registered object models, wherein information of a plurality of pictures captured by changing a relative position and posture of the object is input, and variations in appearance of the object caused by possible variations in a capturing environment are estimated to be modeled based on the input information of a plurality of pictures.

Because of the above-mentioned structure, the program is loaded onto a computer to be executed, whereby a picture recognition apparatus can be realized, which is capable of matching an input picture with a registered object model with a good precision without being influenced by the variations in appearance caused by the difference in an object's posture and the variations in appearance caused by the variation in illumination conditions between object model registration and input picture recognition.

These and other advantages of the present invention will become apparent to those skilled in the art upon reading and understanding the following detailed description with reference to the accompanying figures.

DESCRIPTION OF THE PREFERRED EMBODIMENTS

Figure 1:
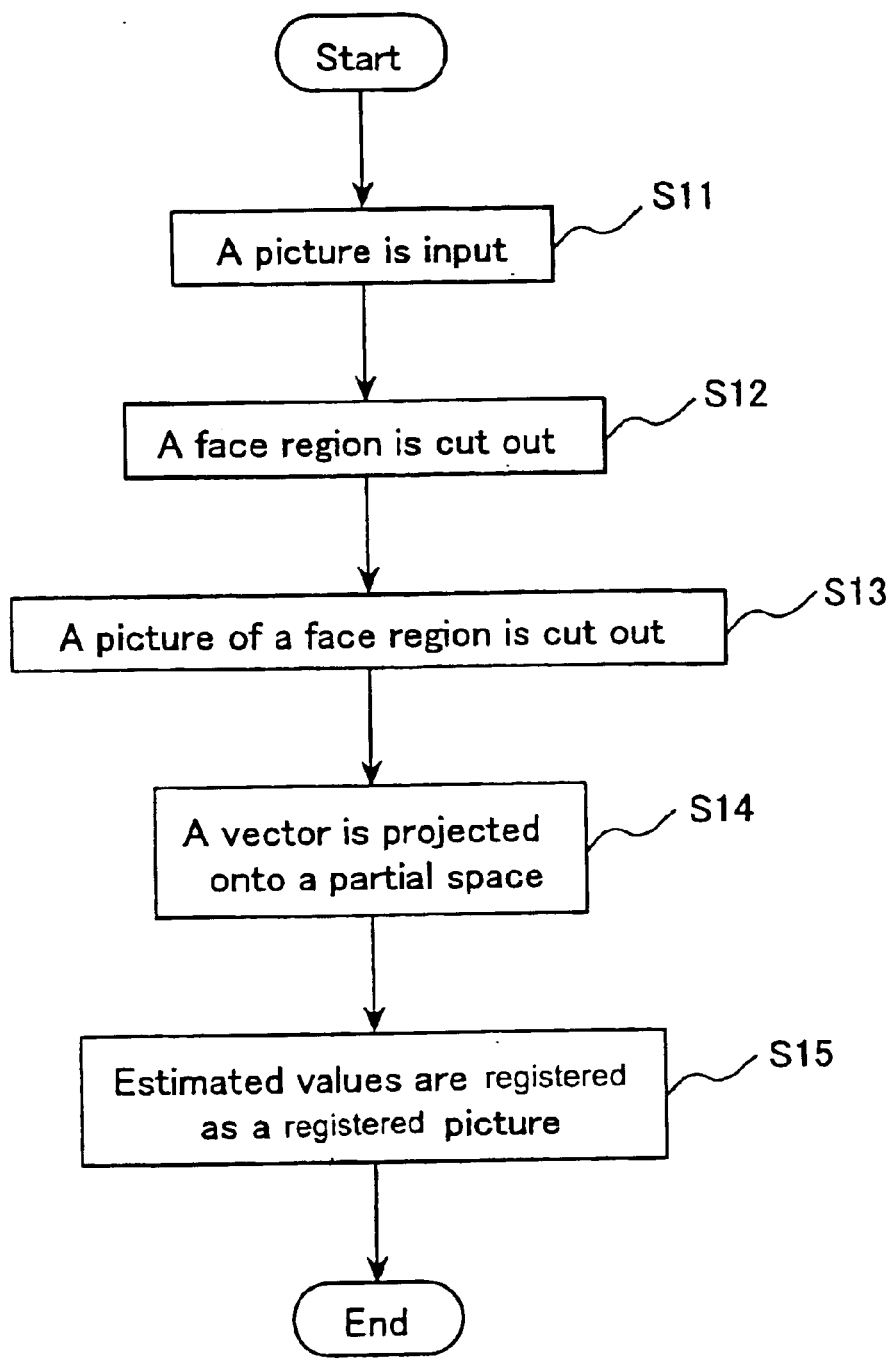
FIG. 1 is a flow chart illustrating registration processing of an object model in a conventional picture recognition apparatus.
Figure 2:
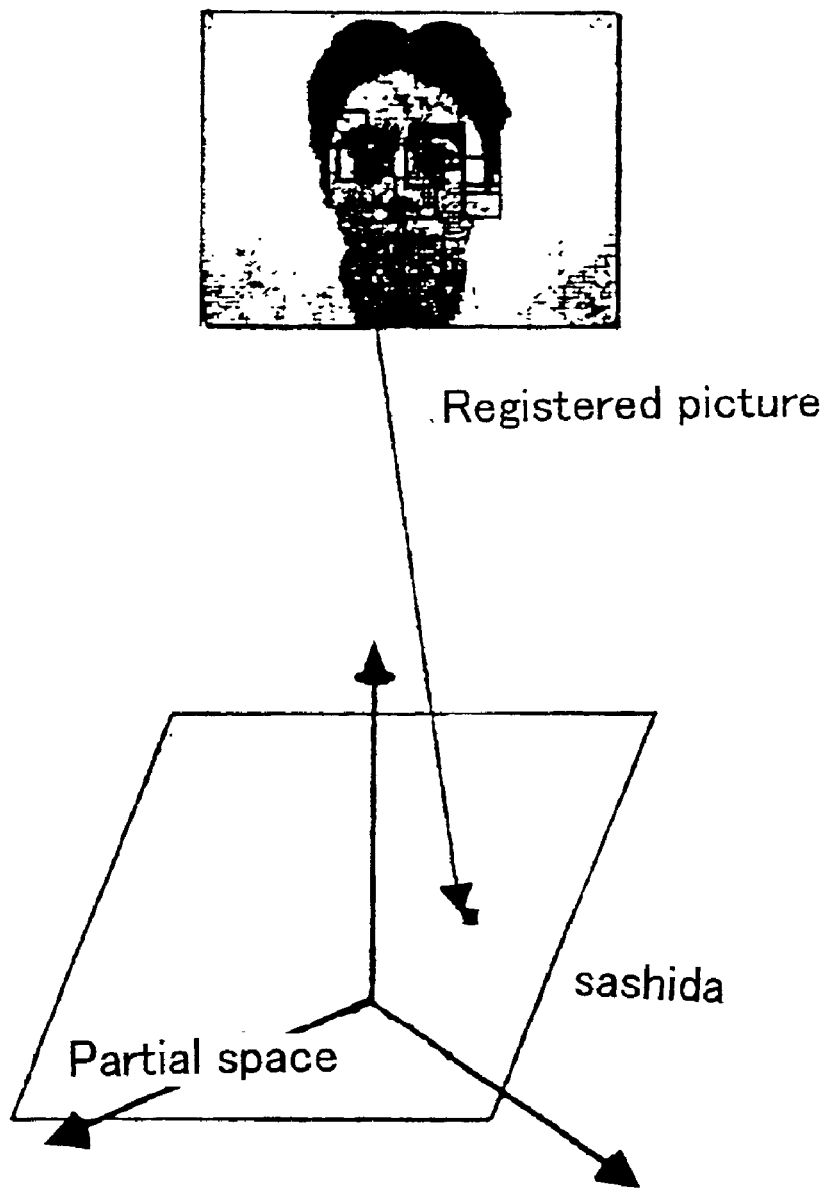
FIG. 2 is a conceptual diagram of registration processing of an object model in a conventional picture recognition apparatus.
Figure 3:
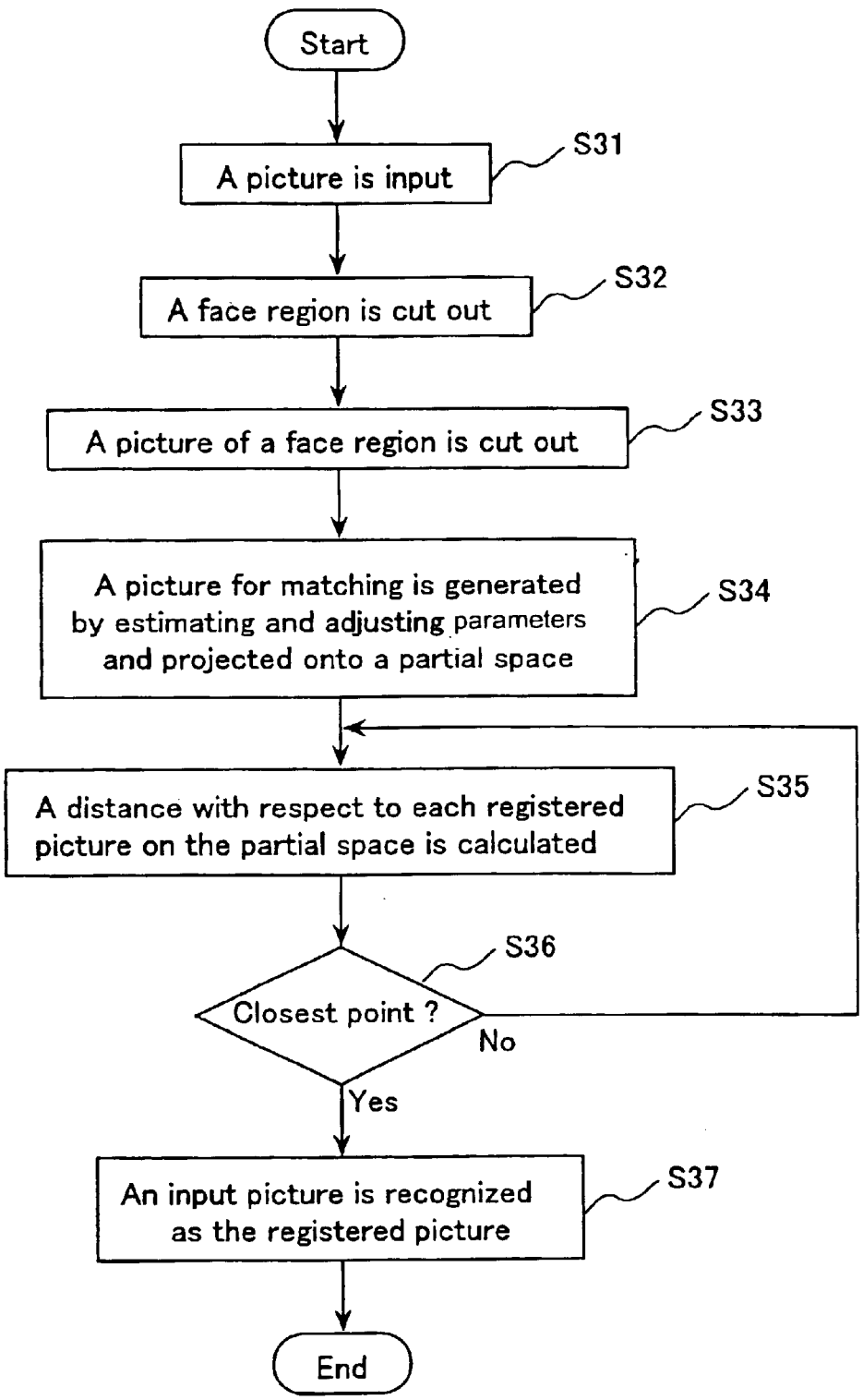
FIG. 3 is a flow chart illustrating processing in a conventional picture recognition apparatus.
Figure 4:
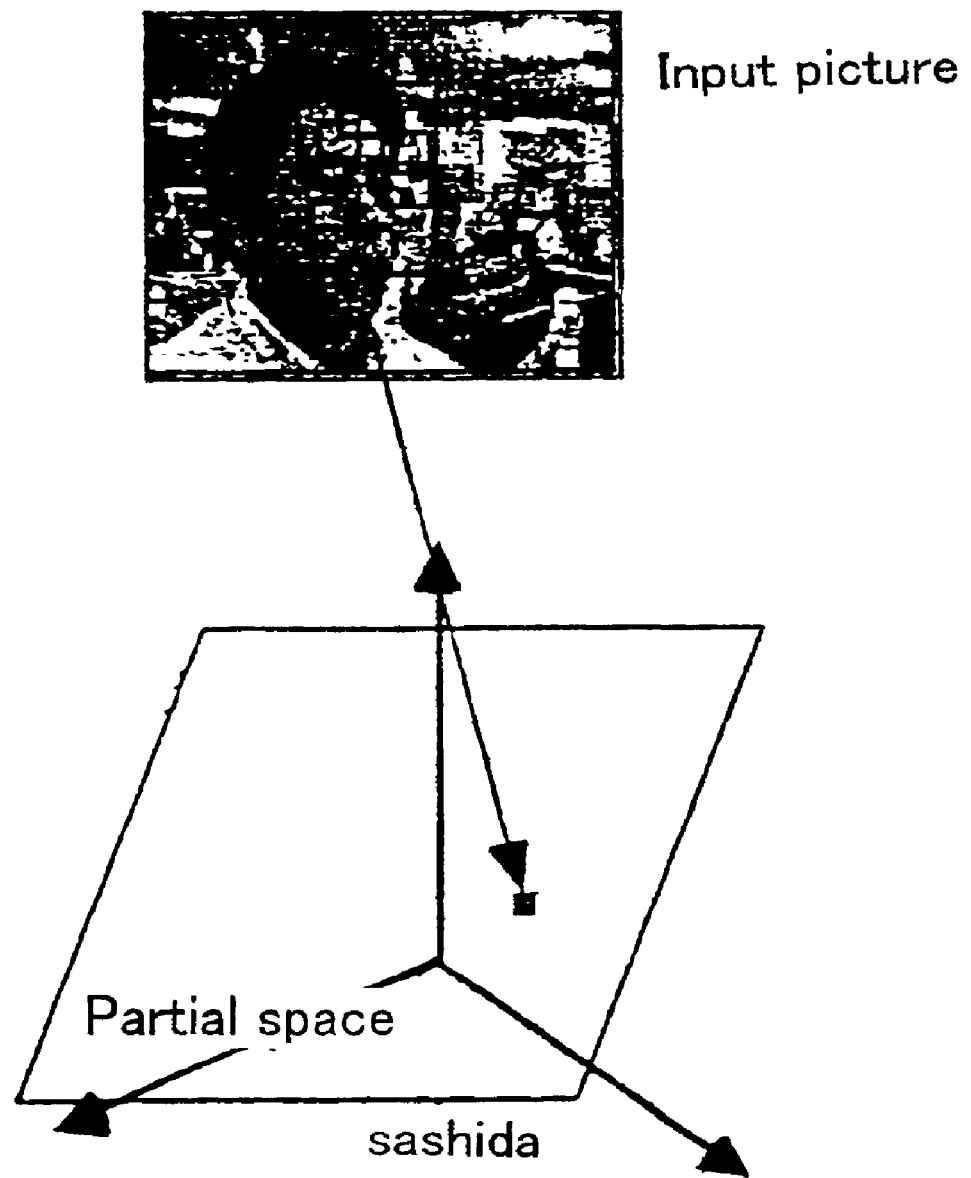
FIG. 4 is a conceptual diagram of processing in a conventional picture recognition apparatus.
Figure 5:
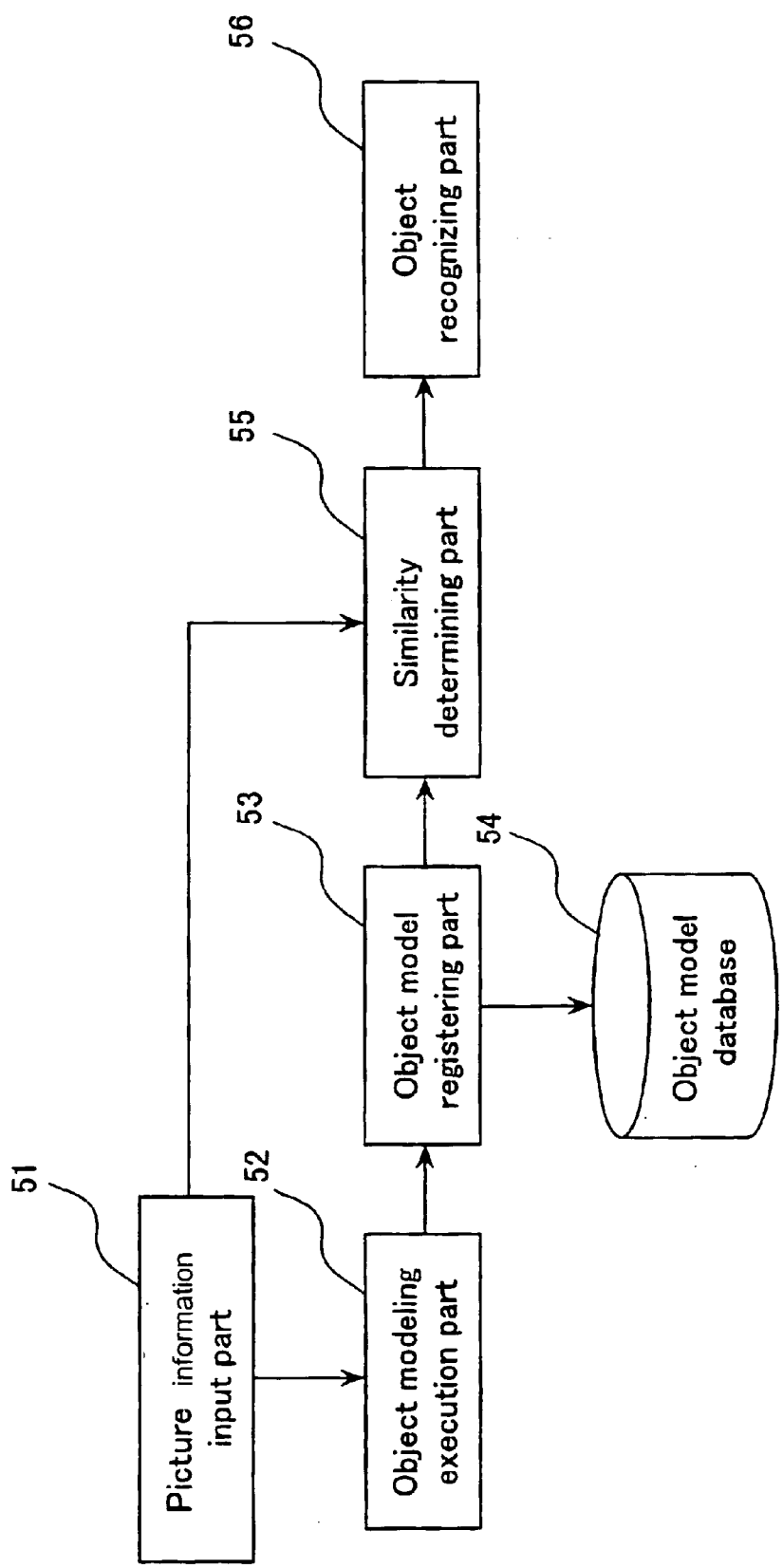
FIG. 5 is a block diagram of a picture recognition apparatus of an embodiment according to the present invention.

Hereinafter, a picture recognition apparatus of Embodiment 1 according to the present invention will be described with reference to the drawings. FIG. 5 is a block diagram of the picture recognition apparatus of Embodiment 1 according to the present invention. In FIG. 5, reference numeral 51 denotes a picture information input part, 52 denotes an object modeling execution part, 53 denotes an object model registering part, 54 denotes an object model database, 55 denotes a similarity determining part, and 56 denotes an object recognizing part.

In FIG. 5, the picture information input part 51 refers to a part prepared for inputting picture information, such as a camera for capturing a picture to be a recognition target, a scanner for reading a photograph and the like captured by the camera, and a reading apparatus for reading a compressed file of captured pictures stored in a magnetic recording medium. Based on the picture information input through the picture information input part 51, the object modeling execution part 52 models an object to be a recognition target.

Various methods are considered for a procedure of modeling picture information in the object modeling execution part 52. For example, JP11(1999)-110020 discloses a method for uniquely representing an object model, using feature parameters as described above.

However, such a modeling procedure has the following problems. First, there is only one input picture for modeling with respect to one object, so that even in the case where the same object is captured at the same camera position, due to the difference in a position, an illuminance, and the like of a light source, the object may be mistaken for another object.

Furthermore, even in the case where the position, illuminance, and the like of a light source are the same, if the position between the camera and the object is varied, the object may also be mistaken for another object. More specifically, if the angle of a camera and the distance between the camera and the object are varied, the size and angle of a picture to be captured are largely varied, and the position in a specific space is largely moved forward or backward. Consequently, it is sufficiently expected that the object will be mistaken for another object.

In order to solve the above-mentioned problems, according to the present embodiment, the posture of an object is continuously varied with respect to a fixed picture information input part at a time of registration, it is expected how a picture will be changed depending upon the variations in an environment at a time of input (i.e., the difference in illumination conditions and the state of a target object (relative posture and relative distance with respect to a camera)), based on the continuous pictures, and an object model based on the expectation is registered in the object model database 54 as a partial space.

Figure 6:
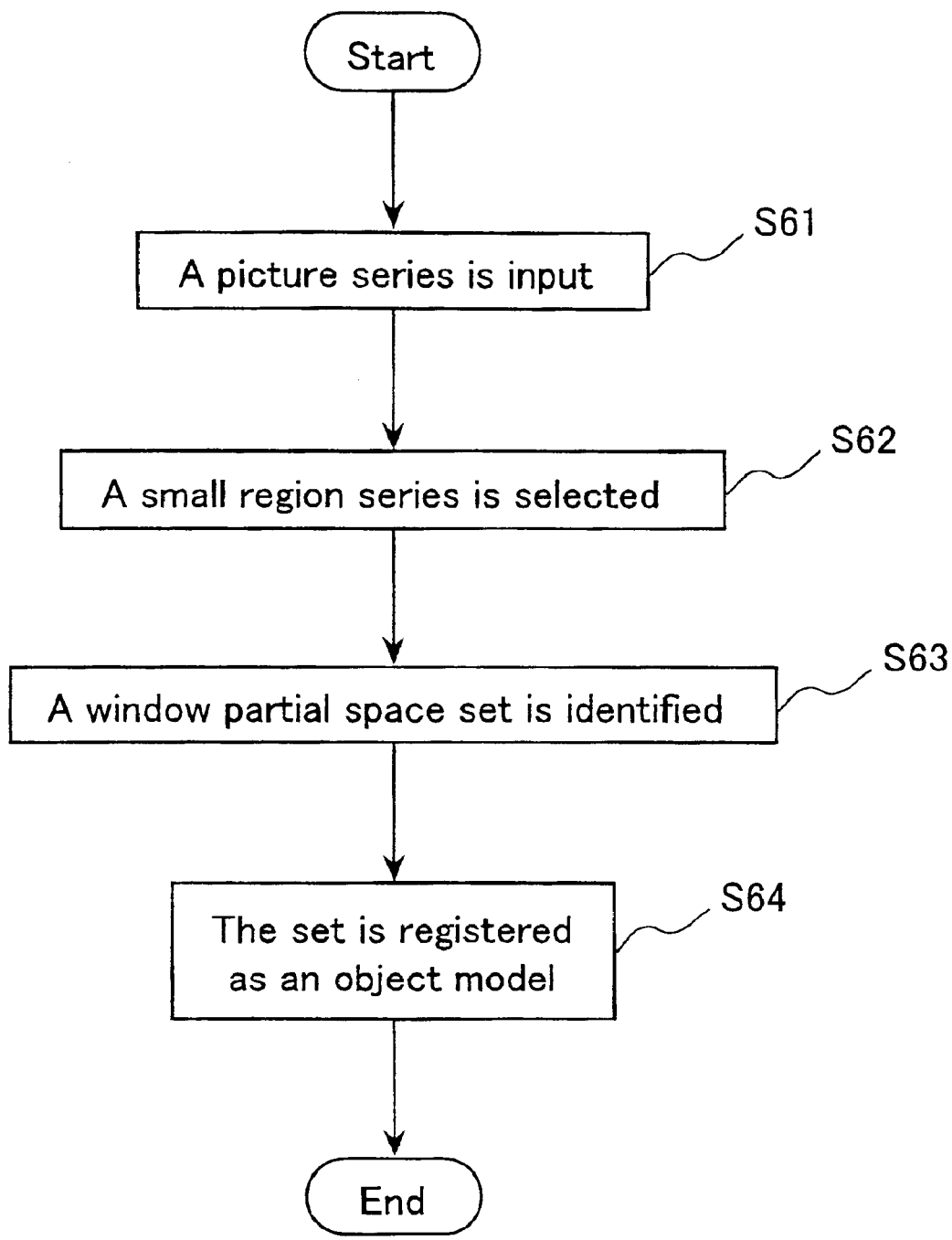
FIG. 6 is a flow chart illustrating registration processing of an object model in a picture recognition apparatus of an embodiment according to the present invention.
Figure 7:
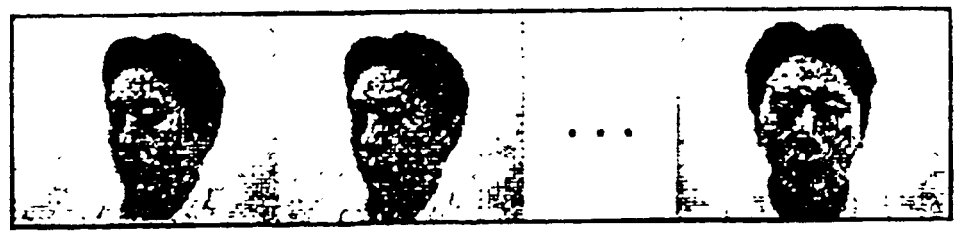
FIG. 7 is a conceptual diagram of registration processing of an object model in a picture recognition apparatus of an embodiment according to the present invention.
Figure 7:
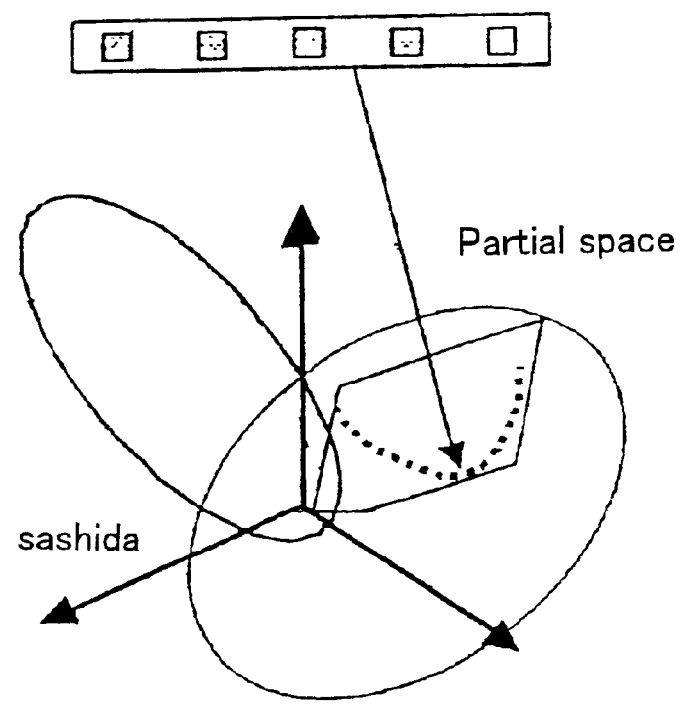

Hereinafter, a modeling procedure in the picture recognition apparatus of the present embodiment will be described with reference to FIGS. 6 and 7. FIG. 6 shows a flow of modeling processing in a registration phase in the picture recognition apparatus of the present embodiment.

As shown in FIG. 6, pictures are input (Operation 61). In this case, one picture is not input, but a continuous plurality of pictures are input. More specifically, as shown in FIG. 7, not only a face picture captured in the front direction but also continuous face pictures (in which a person gradually turns his/her face) are input as a picture series for registration.

Then, each small region is tracked for the continuous plurality of pictures in the input picture series, whereby a small region series is selected from the continuous plurality of pictures (Operation 62). More specifically, in the case of paying attention to an eye, regarding the input picture series, a small region series of a small region representing an "eye" will be selected.

Based on the selected small region series, a partial space is newly generated (Operation 63). More specifically, as shown in FIG. 7, a partial space is identified with respect to a corresponding portion in the continuous pictures (e.g., an "eye region" in a face picture), and such a partial space will be referred to as a window partial space.

In the window partial space, variations in appearance of a small region picture, caused by the geometric variations in a position and a posture of an object and the variations in a position and an illuminance of illumination are taken into account. Such a window partial space is identified so as to correspond to each region, such as an "eye region" and a "nose region". The set of these regions thus obtained is registered in the object model database 54 as an object model (Operation 64).

Figure 8:
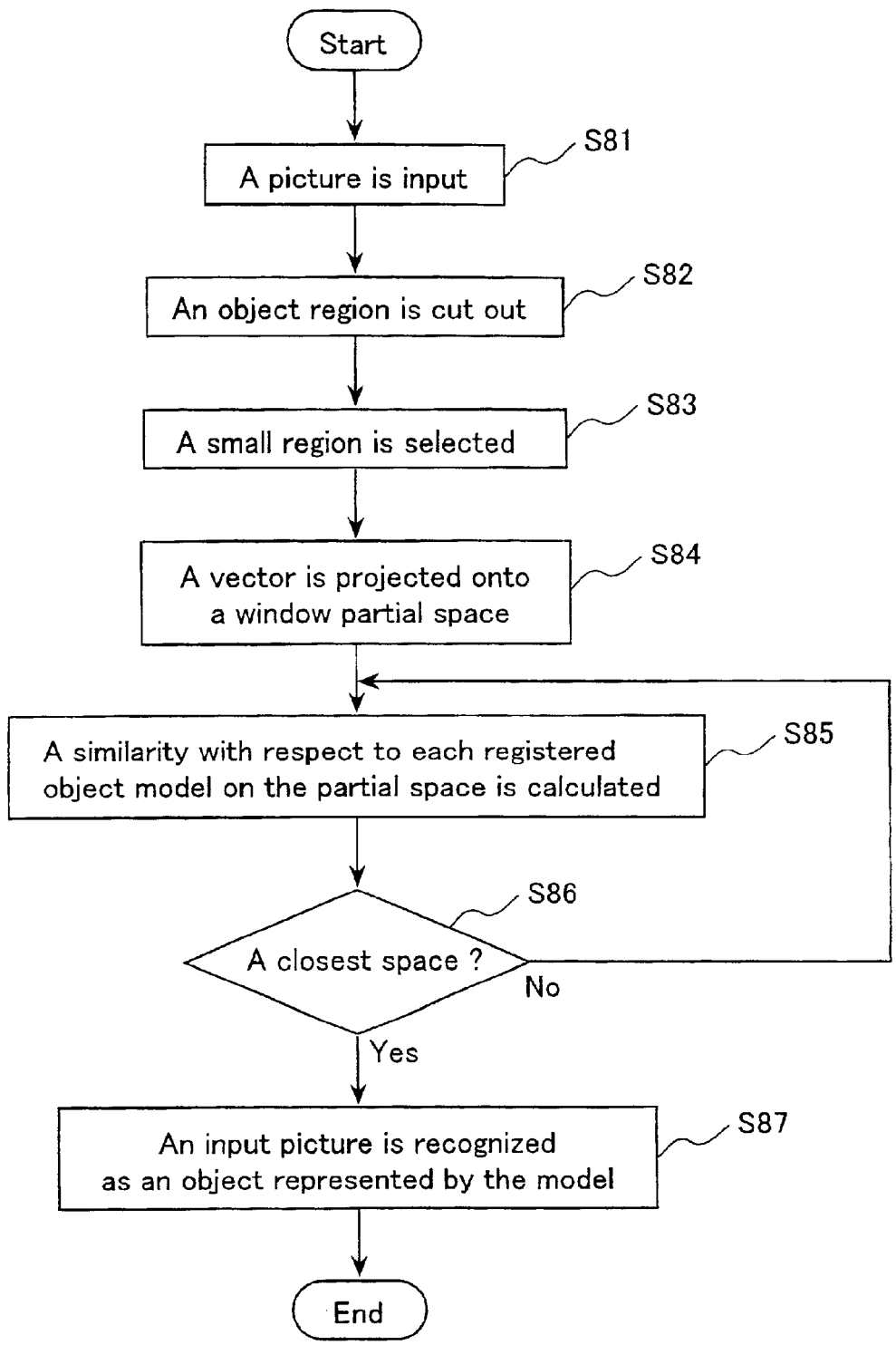
FIG. 8 is a flow chart illustrating processing in a picture recognition apparatus of an embodiment according to the present invention.
Figure 9:
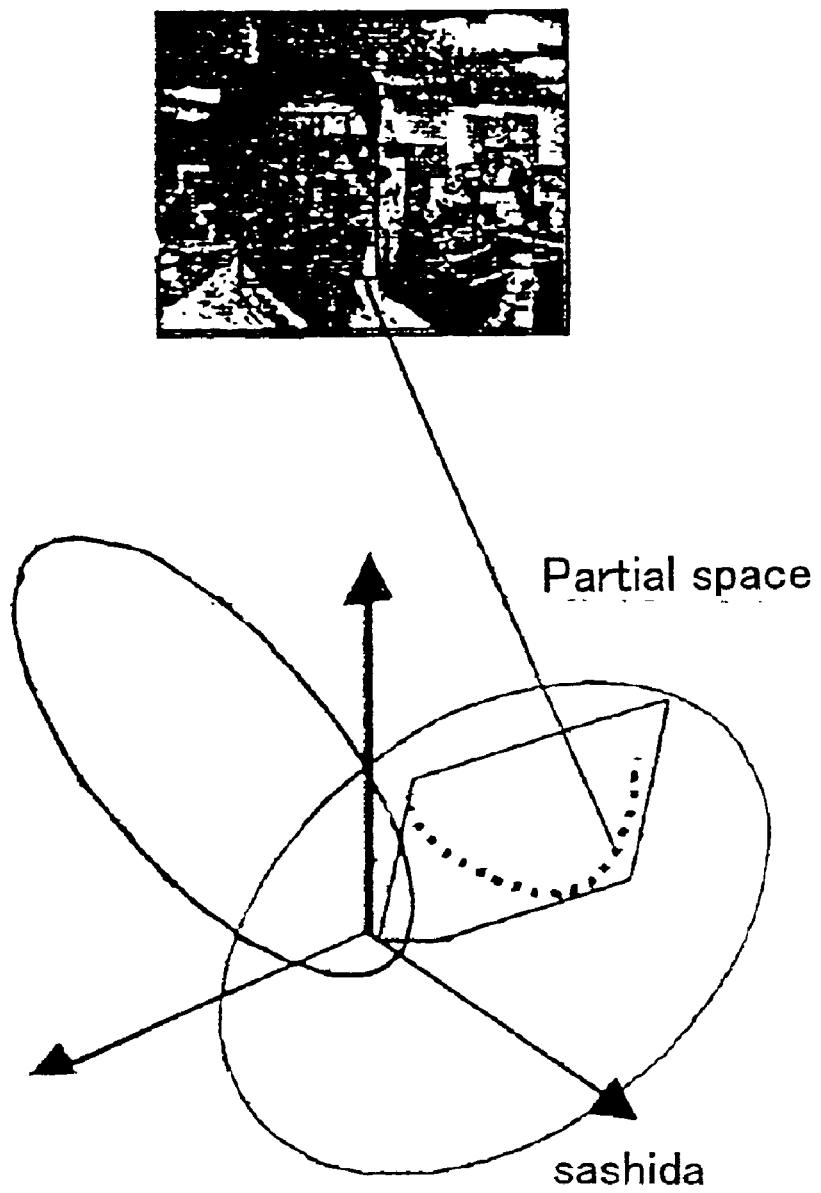
FIG. 9 is a conceptual diagram of processing in a picture recognition apparatus of an embodiment according to the present invention.

Next, the processing of actually recognizing an input picture will be described with reference to FIGS. 8 and 9. FIG. 8 is a flow chart illustrating picture recognition processing in the picture recognition processing.

In FIG. 8, a picture to be a matching target of the object model database 54 is input (Operation 81). Then, a face region is cut out from the picture (Operation 82). Furthermore, a plurality of small regions (windows), which are feature portions, are selected from the face region (Operation 83). As a method for selecting a window, a method using "edge intensity" used in Embodiment 2 in JP11(1999)-110020 can be used. As shown in FIG. 9, a vector (window vector) having a pixel value of each window as an element is projected onto each window partial space registered in the object model database 54 (Operation 84).

In the similarity determining part 55, the length of the normal obtained by projecting the window vector onto a window partial space is calculated, and the similarity between the small region and the window partial space is defined based on the length (Operation 85). A window partial space closest to the small region is found (Operation 86), and a registered object model having such a partial space is set as a candidate for an object in the input picture. The similar processing is conducted with respect to all the windows in the input picture, and finally, the results are integrated to conduct recognition in the object recognizing part 56 (Operation 87).

According to the modeling procedure in the picture recognition apparatus of the present embodiment, the position of a light source is not important at a time of modeling. However, it is required not to vary the position and angle of the light source in capturing continuous pictures. If the position and angle of the light source are varied, it will be difficult to predict and calculate the changes in pictures with respect to the variations in capturing conditions at a time of input.

Next, identification of a window partial space at a time of registration will be described in detail. First, a plain element $Q_i$ that is a small region corresponding to a pixel on the object surface is considered. The plain element $Q_i$ is assumed as a Lambertian surface having a reflection coefficient $a_i$. Herein, the Lambertian surface refers to a reflective surface having no mirror surface reflection.

In general, even in the case of capturing the same face as that in registration, the relative relationship between the plain element $Q_i$ and the camera position, illumination conditions, and the like at a time of input for recognition cannot match with those in capturing for registration. Thus, a pixel value at the corresponding position in the corresponding window is also varied depending upon the capturing conditions at a time of input.

For example, in a coordinate system in which a window is fixed, it is assumed that a pixel value of a coordinate vector x before a variation is I(x), and a pixel value after a variation is I'(x). In the case where a rotation amount, a size change amount, and the like in the selected window are small under the assumption of no variations in illumination, a movement amount $\Delta x$ of the corresponding point in the coordinate system in which a window is fixed is expressed by Formula (1). In Formula (1), A represents a 2×2 matrix having parameters of affine transformation as elements, d represents a 2×1 column vector having parameters of affine transformation as elements, and I in D=I−A is a 2×2 unit matrix, respectively.

$$\Delta x = x - x_b \quad (1)$$
$$= x - (Ax + d)$$
$$= (I - A)x + d$$
$$= Dx + d$$

It becomes possible to handle the deformation of a non-rigid body that can be approximated by affine transformation, if $\Delta x$ is minute. If Taylor expansion is conducted under the assumption that a pixel value is stored before and after the movement, the pixel value I'(x) after a variation can be approximated as represented by Formula (2), using the pixel value I(x) before a variation.

$$I'(x) = I(x - \Delta x) \quad (2)$$
$$= I(x - Dx - d)$$
$$= I(x) - \left\{ u \cdot \frac{\partial I(x)}{\partial x} + v \cdot \frac{\partial I(x)}{\partial y} \right\} + O(u^2, v^2)$$
$$= I(x) - (I_x u + I_y v)$$

where $$I_x = \frac{\partial I(x)}{\partial x}, I_y = \frac{\partial I(x)}{\partial y},$$
$$\begin{pmatrix} u \\ v \end{pmatrix} = \begin{pmatrix} d_{xx} & d_{xy} \\ d_{yx} & d_{yy} \end{pmatrix} \begin{pmatrix} x \\ y \end{pmatrix} + \begin{pmatrix} d_x \\ d_y \end{pmatrix},$$

-continued $$D = \begin{pmatrix} d_{xx} & d_{xy} \\ d_{yx} & d_{yy} \end{pmatrix}, d = \begin{pmatrix} d_x \\ d_y \end{pmatrix}$$

The pixel value I'(x) after a variation can be expressed by Formula (3), using the pixel value I(x) before a variation. Therefore, the second term in the right side can be expressed by Formula (4), using a change amount vector $\Delta I_g$ of each pixel value in the window based on only the geometric variations.

$$I'(x) = I(x) - (d_{xx} d_{xy} d_x d_{yx} d_{yy} d_y) \begin{pmatrix} xI_x \\ yI_x \\ I_x \\ xI_y \\ yI_y \\ I_y \end{pmatrix} \quad (3)$$

$$I'(x) = I(x) + \Delta I_g \quad (4)$$

As described above, the degree of freedom of the change amount vector $\Delta I_g$ is "6", and the partial space in the window picture space can be generated using the following 6 base vectors: $\omega_1$, $\omega_2$, $\omega_3$, $\omega_4$, $\omega_5$, and $\omega_6$, which can be expressed by Formula (5).

$$\omega_1 = (x_1 I_{1x}, x_2 I_{2x}, \ldots, x_N I_{Nx})^T \quad (5)$$
$$\omega_2 = (y_1 I_{1x}, y_2 I_{2x}, \ldots, y_N I_{Nx})^T$$
$$\omega_3 = (I_{1x}, I_{2x}, \ldots, I_{Nx})^T$$
$$\omega_4 = (x_1 I_{1y}, x_2 I_{2y}, \ldots, x_N I_{Ny})^T$$
$$\omega_5 = (y_1 I_{1y}, y_2 I_{2y}, \ldots, y_N I_{Ny})^T$$
$$\omega_6 = (y_{1y}, I_{2y}, \ldots, I_{Ny})^T$$

On the other hand, when the case in which only illumination conditions are varied is considered, a radiation luminous intensity $L_i$ of the plain element $Q_i$ in the lens direction can be expressed by Formula (6). Herein, a vector $n_i$ is a normal vector at the plain element $Q_I$, and a vector s is a beam vector, respectively.

$$L_i = a_1(n_1 \cdot s) \quad (6)$$

Assuming that the opening area of a photodetector for capturing is b, the photoelectric conversion characteristics of a CCD are linear, and a proportional constant is k, the pixel value $I(x_i)$ can be expressed by Formula (7).

$$I(x_i) = bkE(x_i) \quad (7)$$
$$= bka_i(n_i \cdot s) \cdot \frac{\pi}{4} \left( \frac{d}{f} \right)^2 (u \cdot v)$$

where d is a diameter of a lens, f is a focal length, a vector u is a unit vector in an optical axis direction, and a vector v is a unit vector directed from the plain element $Q_i$ to the center of the lens.

In Formula (7), the vectors u, bk, f, and d are constant as long as the camera is not changed. In the case where a window is sufficiently small, the vector v is considered to be the same with respect to all the elements in the window, and the vector s is also considered to be the same with respect to all the elements in the window. Therefore, it is considered that the pixel value $I(x_i)$ is obtained by calculating the inner product of the vector s and a vector $a_i n_i = (a_i n_{ix}, a_i n_{iy}, a_i n_{iz})^T$ (which is obtained by multiplying a normal vector $n_i$ of a corresponding plain element by a reflection coefficient $a_i$ of the plain element) by a common coefficient.

Thus, the degree of freedom of the pixel value $I(x_i)$ is "3" that is the degree of freedom of the vector $a_i n_i$. The variations in a window picture vector in the case of only the variations in illumination can be represented by a three-dimensional partial space that can be generated by three base vectors $v_x$, $v_y$, and $v_z$ expressed by the following Formula (8).

$$v_x = (a_1 n_{1x}, a_2 n_{2x}, \ldots, a_N n_{Nx})^T \quad (8)$$
$$v_y = (a_1 n_{1y}, a_2 n_{2y}, \ldots, a_N n_{Ny})^T$$
$$v_z = (a_1 n_{1z}, a_2 n_{2z}, \ldots, a_N n_{Nz})^T$$

Thus, in the case where illumination conditions are varied or the relative relationship between the plain element $Q_i$ and the camera position is varied, they are varied in a 9-dimensional partial space generated by the vectors $\omega_1$, $\omega_2$, $\omega_3$, $\omega_4$, $\omega_5$, $\omega_6$, $v_x$, $v_y$, and $v_z$. Consequently by obtaining sufficient sample data in the case where the relative relationship between the plain element $Q_i$ and the camera position is varied, a 9-dimensional window partial space can be identified by using KL transformation.

The case will be exemplified in which the relative relationship between the plain element $Q_i$ and the camera position is varied while a cameral and illumination are fixed. First, it is assumed that the plain element $Q_i$ is moved without being varied in shape, and consequently, the normal vector n is changed to (n+$\Delta$n), and the unit vector v directed to the center of the lens is changed to (v+$\Delta$v). It is also assumed that the projection position of the plain element Q is moved from a vector $x_t$ to a vector x.

It is also assumed that the projection position of the plain element $Q_i$ is moved from a vector $x_1\hat{}$ to a vector $x_i$. A surface radiation luminous intensity $L_i'$ of the plain element $Q_i$ after a variation in the lens direction can be expressed by Formula (9), using Formula (6).

$$L_1' = L_1 + a_1(\Delta n \cdot s) \quad (9)$$

Thus, by obtaining a radiation illuminance of the corresponding pixel, the pixel value $I'(x_i)$ can be expressed by Formula (10). Herein, it is assumed that $\Delta I_v$ is a change amount vector of each pixel value in the window based on the relative positional change with respect to the camera, and $\Delta I_n$ is a change amount vector of each pixel value in the window based on variations in illumination conditions caused by the relative positional change with respect to the camera.

$$I'(x_i) = bkE(x_i) \quad (10)$$
$$= I(x_i\hat{}) + \Delta I_n + \Delta I_v$$

If the relationship expressed by Formula (4) of variations in a pixel value caused by only the relative change of an object and a camera position is considered, $I(x_1\hat{}) = I(x) + \Delta I_g$ can be obtained. Therefore, Formula (10) can be expressed by Formula (11).

$$I'(x) = I(x) + \Delta I_g + \Delta I_n + \Delta I_v \quad (11)$$

Herein, the degree of freedom of $\Delta I_g$ is "6", whereas the degree of freedom of $\Delta I_n$ and $\Delta I_v$ is "3", and the partial space meant by $\Delta I_n$ and $\Delta I_v$ is the same partial space. Therefore, it is understood that the range of variations in the change amount vector $\Delta I = I'(x) - I(x)$ is in a partial space of at most 9 dimensions.

In this case, it is actually difficult to obtain sufficient sample data on geometric variations such as the change in size and the rotation of an object. However, a partial space (hereinafter, referred to as a "geometric variation partial space") corresponding to the geometric variations, generated by the vectors $\omega_1$, $\omega_2$, $\omega_3$, $\omega_4$, $\omega_5$, and $\omega_6$ can be estimated from only one small region.

Therefore, first, a geometric variation partial space is obtained based on sample data, and a distribution of components excluding the components of the obtained geometric variation partial space is obtained. This distribution is subjected to KL transformation, whereby a partial space (hereinafter, referred to as "photometric variation partial space") corresponding to photometric variations, generated by the vectors $v_x$, $v_y$, and $v_z$ can be obtained. Because of this, any partial space can be expressed by using the geometric variation partial space and the photometric variation partial space.

Furthermore, there are roughly two methods for identifying a partial space. One is a method for assuming that a geometric variation partial space is orthogonal to a photometric variation partial space. The other is a method for directly identifying without distinguishing a geometric variation partial space from a photometric variation partial space used in the case where there is enough sample data.

First, the method for assuming that a geometric variation partial space is orthogonal to a photometric variation partial space will be described. For collecting sample data on a face picture, a registered target person is instructed to turn his/her face to change the direction of the face.

A standard small region is stored as a standard small region vector $x_s$, based on the average position of a data point distribution in one small region change series plotted in a small region space or the center of a variation range. This is because false data is mixed in sample data, and there is data that deviates from the assumption with respect to the boundary of linear approximation of the geometric deformation and the Lambertian surface, or deviates from the partial space due to noise and the like.

The vectors $\omega_1$, $\omega_2$, $\omega_3$, $\omega_4$, $\omega_5$, and $\omega_6$ are calculated from the obtained standard small region vector $x_s$ based on Formula (5). Differential of a pixel value can be approximately calculated by convolution of a Sobel filter.

By obtaining the vectors $\omega_1$, $\omega_2$, $\omega_3$, $\omega_4$, $\omega_5$, and $\omega_6$ as described above, a geometric variation partial space vector $\Omega$ can be identified. However, these vectors are not always linearly independent, so that a matrix $G = [\omega_1, \omega_2, \omega_3, \omega_4, \omega_5, \omega_6]^T$ is decomposed into a singular value, whereby a normal orthogonal base vector $u_p$ ($1 \leq p \leq 6$) of the partial space vector $\Omega$ is obtained. p is a rank of the matrix G.

Figure 10:
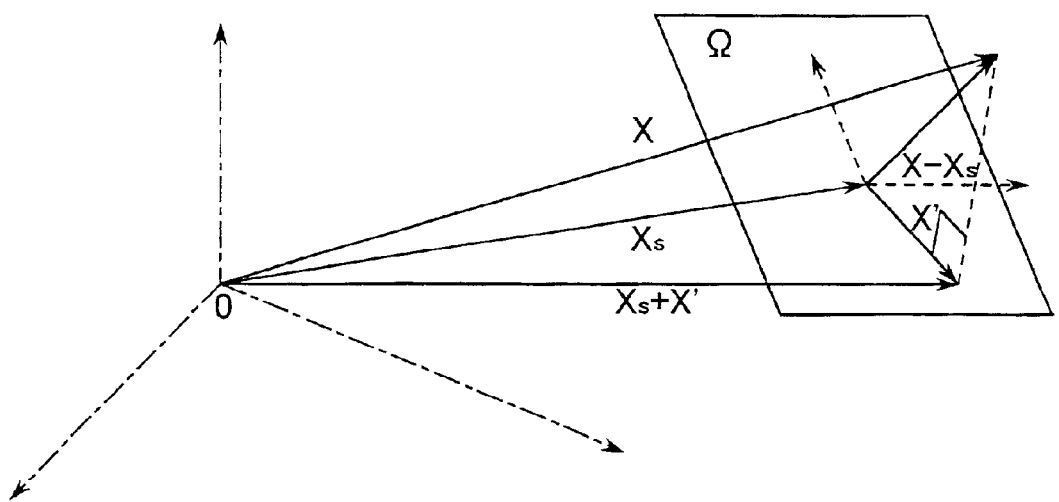
FIG. 10 is a diagram illustrating how to obtain a small region vector orthogonal to a geometric variation partial space.
Figure 11:
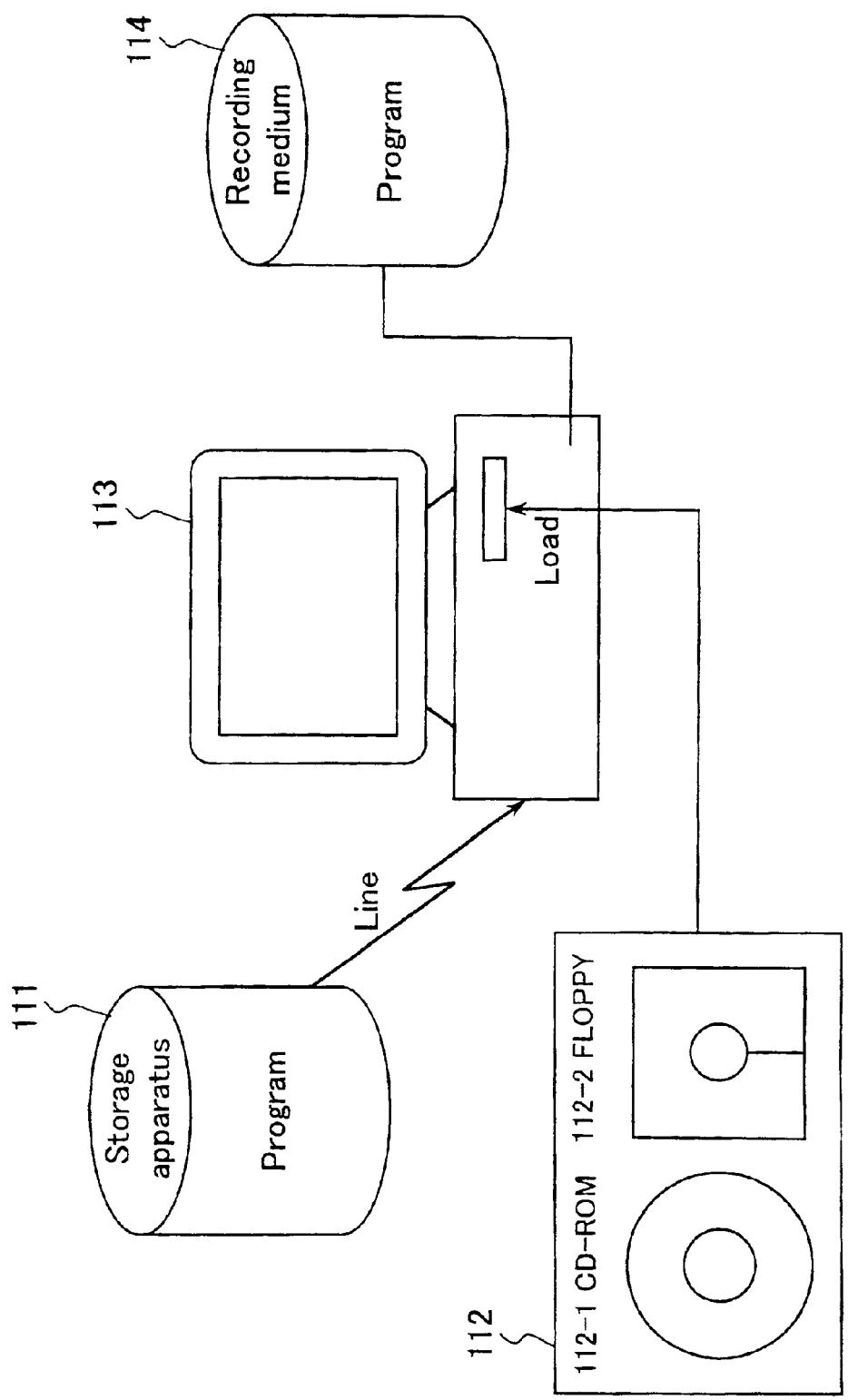
FIG. 11 illustrates recording media.

Next, a component orthogonal to the geometric variation partial space $\Omega$ of an arbitrary window picture vector x can be obtained in accordance with the procedure shown in FIG. 10. In FIG. 10, it is assumed that the standard picture vector of the geometric variation partial space $\Omega$ is $x_s$, and the difference between a vector x and a vector $x_s$ orthogonally projected onto the geometric variation partial space $\Omega$ is a vector x'.

An orthogonal projection matrix P of the geometric variation partial space $\Omega$ can be expressed by Formula 12, using the normal orthogonal base vector $u_p(1 \leq p \leq 6)$.

$$P = \sum_{i=1}^{p} u_i u_i^T \quad (12)$$

Furthermore, x'=P*(x-x_s) is obtained from the vector relationship in FIG. 6. Herein, it is assumed that the symbol "*" refers to multiplication of vectors.

On the other hand, an orthogonal projection matrix Q of the geometric variation partial space Ω with respect to an orthogonal auxiliary space $Ω^T$ can be expressed as Q=I-P (I is a unit matrix). Therefore, a component orthogonal to the geometric variation partial space Q of an arbitrary small region vector x can be obtained as (x-x_s)-x'=Q*(x-x_s). Q*(x-x_s)

The distribution of Q*(x-x_s) thus obtained is subjected to KL transformation, whereby a photometric variation partial space Ψ is identified. First, $y_j=Q*(x_j-x_s)$ (j is a natural number of 1≦j) is calculated from all the small region vectors $x_j$ belonging to the small region change series. An auto-correlation matrix R of a vector y is obtained by Formula (13).

$$R = \frac{1}{M} \sum_{i=1}^{M} y_j y_j^T \quad (13)$$

Eigenvalues and eigenvectors of the matrix R are obtained, and set as $λ_1, λ_2, \ldots λ_N$ in the descending order. A normal orthogonal eigenvector corresponding to each eigenvalue is set as $v_1, v_2, \ldots, v_N$. If the ratio of a value obtained by adding a plurality of n eigenvalues in the descending order with respect to the sum of the eigenvalues is defined as an accumulation contribution ratio, q (number) obtained when the accumulation contribution ratio exceeds a predetermined threshold value is defined as a dimension number of a partial space. Thus, the normal orthogonal base vectors in the photometric variation partial space Ψ become $v_1, v_2, \ldots, v_q$.

Since the geometric variation partial space Ω and the photometric variation partial space Ψ are identified as described above, by subjecting them to vector coupling, an environment variation partial space Γ and a window partial space Λ are identified. More specifically, the environment variation partial space Γ and the window partial space Λ can be expressed by Formula (14).

$$Γ=Ω+ΨΛ=x_s+Λ \quad (14)$$

Thus, the normal orthogonal base vector of the environment variation partial space Γ becomes a matrix U=[$u_1, u_2, \ldots, u_p$] in which normal orthogonal base vectors of the geometric variation partial space Ω are arranged and a matrix V=[$v_1, v_2, \ldots, v_q$] in which normal orthogonal base vectors of the photometric variation partial space Ψ are arranged. Thus, assuming that a vector $w_i=u_i$ (i is a natural number of 1≦i≦p) and a vector $w_{p+j}=v_j$ (j is a natural number of 1≦j≦q), a matrix W=[$w_1, w_2, w_r$](r=p+q) is obtained in which normal orthogonal base vectors of the environment variation partial space Γ are arranged, whereby a partial space can be determined as the environment variation partial space Γ.

Next, in the case where there is sufficient sample data, a method for directly identifying a partial space without distinguishing a geometric variation partial space from a photometric variation partial space is used.

According to this method, a procedure for collecting sample data and determining a standard small region is the same as that of the above-mentioned method. A partial space is identified by directly subjecting the distribution of a vector (x-x_s) to KL transformation.

First, $y_j=Q*(x_j-x_s)$ (j is a natural number of 1≦j≦M) is calculated from all the small region vectors $x_j$ belonging to the small region change series. In the same way as in the method for assuming that a geometric variation partial space is orthogonal to a photometric variation partial space, an auto-correlation matrix R of a vector y is obtained by Formula (13).

Eigenvalues and eigenvectors of the matrix R are obtained, and set as $λ_1, λ_2, \ldots λ_N$ in the descending order. A normal orthogonal eigenvector corresponding to each eigenvalue is set as $v_1, v_2, \ldots, v_N$. If the ratio of a value obtained by adding a plurality of n eigenvalues in the descending order with respect to the sum of the eigenvalues is defined as an accumulation contribution ratio, r (number) obtained when the accumulation contribution ratio exceeds a predetermined threshold value is defined as a dimension number of a partial space. Thus, a partial space can be determined as a matrix W=[$w_1, w_2, \ldots, w_r$] in which normal orthogonal base vectors of the environment variation partial space Γ are arranged.

Thus, an input picture is matched with a registered object model by identifying an object model using either of the above-mentioned methods, and identifying a partial space closest to the input picture.

As described above, according to the embodiment of the present invention, an input picture can be matched with a registered object model with a good precision without being influenced by the variations in appearance caused by the difference in an object's posture and variations in appearance caused by the difference in illumination conditions between object model registration and input picture recognition.

Furthermore, examples of a recording medium storing a program for realizing the picture recognition apparatus of the present embodiment include a storage apparatus 111 provided at the end of a communication line and a recording medium 114 such as a hard disk and a RAM of a computer 113, as well as a portable recording medium 112 such as a CD-ROM 112-1 and a floppy disk 112-2. In execution, the program is loaded onto a computer, and executed on a main memory.

Furthermore, examples of a recording medium storing object model data and the like generated by the picture recognition apparatus of the present embodiment include a storage apparatus 111 provided at the end of a communication line and a recording medium 114 such as a hard disk and a RAM of a computer 113, as well as a portable recording medium 112 such as a CD-ROM 112-1 and a floppy disk 112-2. For example, such a recording medium is read by the computer 113 when the picture recognition apparatus of the present invention is used.

As described above, according to the picture recognition apparatus of the present invention, an input picture can be matched with a registered object model with a good precision without being influenced by the variations in appearance caused by the difference in an object's posture and variations in appearance caused by the difference in illumination conditions between object model registration and input picture recognition.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A picture recognition apparatus, comprising:
an object modeling execution part for estimating variations in appearance of an object caused by variations in a capturing environment and modeling the object;
an object model registering part for previously registering the object model obtained in the object modeling execution part in a database;
a picture information input part for inputting picture information of an object to be a recognition target;
a similarity determining part for matching the input picture information with the object model previously registered in the object model registering part, and determining a similarity with respect to the registered object model; and
an object recognizing part for outputting a type of the object to be a recognition target determined to be most similar among the registered object model,
wherein, in the object modeling execution part, information of a plurality of pictures captured by changing a relative position and posture of the object with respect to the fixed picture information input part is input, and variations in appearance of the object caused by possible variations in a capturing environment are estimated to be modeled based on the input information of a plurality of pictures,
wherein, in the picture information input part, a characteristic small region in the object to be a recognition target is selected from a picture, and the object to be a recognition target is modeled based on information included in the selected small region and arrangement information of the small region, and
wherein the modeling in the picture information input part is performed by identifying a partial space in which a vector having a pixel value of the small region as an element is varied, and separating the partial space into a partial space corresponding to geometric variations and a partial space corresponding to photometrical variations, and identifying each of the partial spaces successively using sample data.

2. A picture recognition apparatus according to claim 1, wherein a Lambertian reflection model is assumed as surface characteristics of the object to be a recognition target.

3. A picture recognition apparatus according to claim 1, wherein, in the picture information input part, a portion including the object to be a recognition target is cut out from a picture, and the object to be a recognition target is modeled using the cut out portion.

4. A picture recognition apparatus according to claim 2, wherein, in the object modeling execution part, variations in appearance caused by variations in a posture of the object and variations in appearance caused by variations in illumination conditions are separately modeled based on the input picture information.

5. A picture recognition apparatus according to claim 3, wherein, in the object modeling execution part, variations in appearance caused by variations in a posture of the object and variations in appearance caused by variations in illumination conditions are separately modeled based on the input picture information.

6. A picture recognition apparatus according to claim 1, wherein, in the object modeling execution part, variations in appearance caused by variations in a posture of the object and variations in appearance caused by variations in illumination conditions are separately modeled based on the input picture information.

7. A picture recognition apparatus according to claim 2, wherein, in the object modeling execution part, variations in appearance caused by variations in a posture of the object and variations in appearance caused by variations in illumination conditions are modeled together based on the input picture information.

8. A picture recognition apparatus according to claim 3, wherein, in the object modeling execution part, variations in appearance caused by variations in a posture of the object and variations in appearance caused by variations in illumination conditions are modeled together based on the input picture information.

9. A picture recognition apparatus according to claim 1, wherein, in the object modeling execution part, variations in appearance caused by variations in a posture of the object and variations in appearance caused by variations in illumination conditions are modeled together based on the input picture information.

10. A picture recognition method, comprising:
estimating variations in appearance caused by variations in a capturing environment and modeling the object;
previously registering the obtained object model in a database;
inputting picture information of an object to be a recognition target;
matching the input picture information with the previously registered object model to determine a similarity with respect to the registered object model; and
outputting a type of the object to be a recognition target determined to be most similar among the registered object models,
wherein, in the modeling, information of a plurality of pictures captured by changing a relative position and posture of the object is input, and variations in appearance of the object caused by possible variations in a capturing environment are estimated to be modeled based on the input information of a plurality of pictures,
wherein, in the picture information inputting, a characteristic small region in the object to be a recognition target is selected from a picture, and the object to be a recognition target is modeled based on information included in the selected small region and arrangement information of the small region, and
wherein the modeling in the picture information inputting is performed by identifying a partial space in which a vector having a pixel value of the small region as an element is varied and separating the partial space into a partial space corresponding to photometrical variations, and identifying each of the partial spaces successively using sample data.

11. A computer-readable recording medium storing a program for allowing a computer to execute the following operations of:
estimating variations in appearance caused by variations in a capturing environment and modeling the object;
previously registering the obtained object model in a database;
inputting picture information of an object to be a recognition target;
matching the input picture information with the previously registered object model to determine a similarity with respect to the registered object model; and outputting a type of the object to be a recognition target determined to be most similar among the registered object models, wherein, in the modeling, information of a plurality of pictures captured by changing a relative position and posture of the object is input, and variations in appearance of the object caused by possible variations in a capturing environment are estimated to be modeled based on the input information of a plurality of pictures, wherein, in the picture information inputting, a characteristic small region in the object to be a recognition target is selected from a picture, and the object to be a recognition target is modeled based on information included in the selected small region and arrangement information of the small region, and wherein the modeling in the picture information inputting is performed by identifying a partial space in which a vector having a pixel value of the small region as an element is varied and separating the partial space into a partial space corresponding to geometric variations and a partial space corresponding to photometrical variations, and identifying each of the partial spaces successively using sample data.

* * * * *

UNITED STATES PATENT AND TRADEMARK OFFICE
CERTIFICATE OF CORRECTION

PATENT NO. : 6,888,955 B2
DATED : May 3, 2005
INVENTOR(S) : Daiki Masumoto et al.

It is certified that error appears in the above-identified patent and that said Letters Patent is hereby corrected as shown below:

Title page,
Item [56], References Cited, U.S. PATENT DOCUMENTS, delete
"5,815,325 A      *      9/1998      Johnson      382/118" and insert
-- 5,715,325      *      2/1998      Bang et al.      382/118 --.
OTHER PUBLICATIONS,
"Georghiades" 1st reference, change "Rcognition" to -- Recognition --.
"Georghiades" 2nd reference, change "anylsis" to -- analysis --.

Signed and Sealed this

Third Day of January, 2006

JON W. DUDAS
*Director of the United States Patent and Trademark Office*